(12) United States Patent
Faigle et al.

(10) Patent No.: US 6,179,322 B1
(45) Date of Patent: Jan. 30, 2001

(54) VEHICLE OCCUPANT PROTECTION APPARATUS

(75) Inventors: Ernst M. Faigle, Dryden; Charles E. Steffens, Jr., Washington; Diane D. Ford, Dryden, all of MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/212,112

(22) Filed: Dec. 15, 1998

(51) Int. Cl.$^7$ ..................................................... B06R 21/16
(52) U.S. Cl. ........................ 280/728.2; 280/732; 280/738; 280/743.1
(58) Field of Search ............................. 280/743.1, 728.2, 280/728.1, 731, 732, 738

(56) References Cited

U.S. PATENT DOCUMENTS

| | | | |
|---|---|---|---|
| 4,101,146 | | 7/1978 | Oehm . |
| 5,340,151 | * | 8/1994 | Sato ...................................... 280/743 |
| 5,427,410 | * | 6/1995 | Shiota et al. ....................... 280/743.1 |
| 5,431,432 | * | 7/1995 | Webber et al. ..................... 280/728.2 |
| 5,518,266 | * | 5/1996 | O'Docherty et al. .............. 280/728.2 |
| 5,520,415 | * | 5/1996 | Lewis et al. ....................... 280/743.1 |
| 5,527,063 | * | 6/1996 | Garner et al. ..................... 280/743.1 |
| 5,531,476 | * | 7/1996 | Kerner .............................. 280/743.1 |
| 5,564,730 | * | 10/1996 | Chizenko et al. ................... 280/732 |
| 5,636,860 | | 6/1997 | Fischer et al. . |
| 5,673,930 | | 10/1997 | Coleman . |
| 5,681,052 | | 10/1997 | Ricks et al. . |
| 5,762,364 | | 6/1998 | Cuevas . |
| 5,836,611 | * | 11/1998 | Palm ................................. 280/743.1 |
| 5,857,696 | * | 1/1999 | Inoue et al. ....................... 280/728.2 |
| 5,899,495 | * | 5/1999 | Yamamoto et al. ............... 280/743.1 |
| 5,901,979 | * | 5/1999 | Schneider et al. ............ 280/743.1 X |
| 5,931,491 | * | 8/1999 | Bosgeiter et al. ................. 280/728.2 |
| 5,941,559 | * | 8/1999 | Rudolf et al. ...................... 280/743.1 |
| 5,979,937 | | 11/1999 | Yoshida et al. . |
| 5,997,034 | * | 12/1999 | Hirai et al. ........................ 280/743.1 |

FOREIGN PATENT DOCUMENTS

| | | |
|---|---|---|
| 19516494 | 10/1996 | (DE) . |
| 2279046A | 12/1994 | (GB) . |
| 406087393 | 3/1994 | (JP) . |

* cited by examiner

Primary Examiner—Lanna Mai
Assistant Examiner—Toan To
(74) Attorney, Agent, or Firm—Tarolli, Sundheim, Covell, Tummino & Szabo L.L.P.

(57) ABSTRACT

A vehicle occupant protection apparatus (10) includes an inflatable vehicle occupant protection device (14) which is folded so as to be deployed from a reaction structure (24) in a first direction to restrain movement of a vehicle occupant in a second, opposite direction. The folded protection device (14) has a cross-section with a configuration defined by pleats (110). Each pleat (110) has an open end (112) and a closed end (114) spaced from the open end (112) in a direction substantially parallel to the first and second directions. An inflator (12) is received within one of the pleats (110') and has inflation fluid outlet openings (124) adjacent to the closed end (114) of the pleat (110'). A retainer ring (56) engages and supports a peripheral edge portion (72) of the folded protection device (14) in an open configuration. The bag retainer ring (56) and the edge portion (72) of the folded protection device (14) are spaced fully from the inflator (12) on opposite sides of the pleated cross-section of the folded protection device (14).

6 Claims, 4 Drawing Sheets

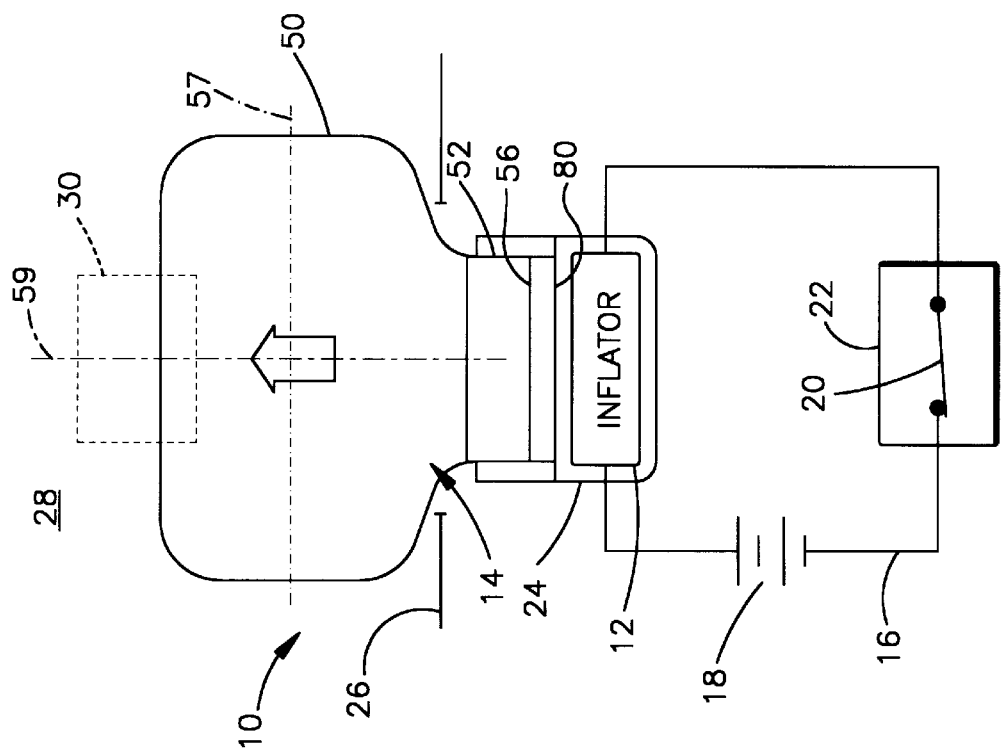
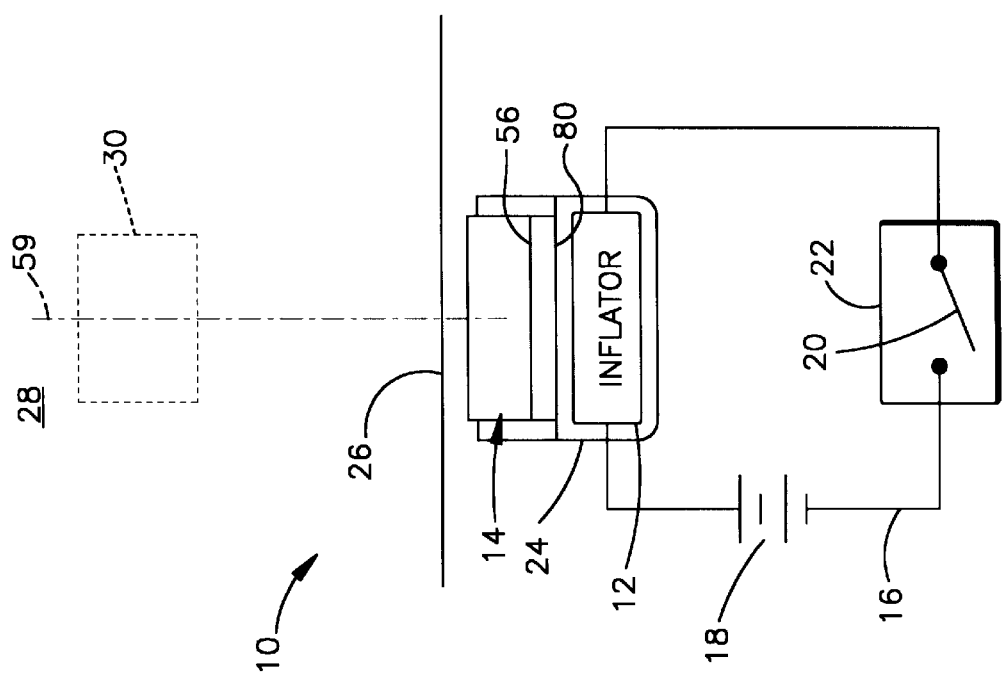

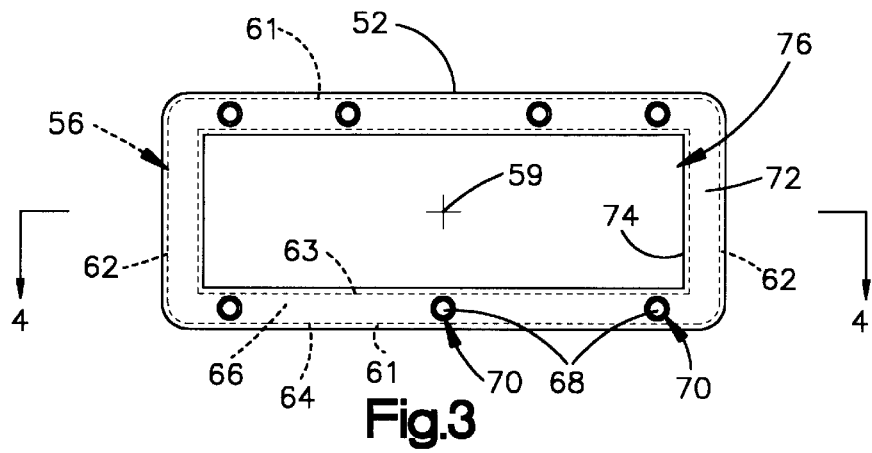
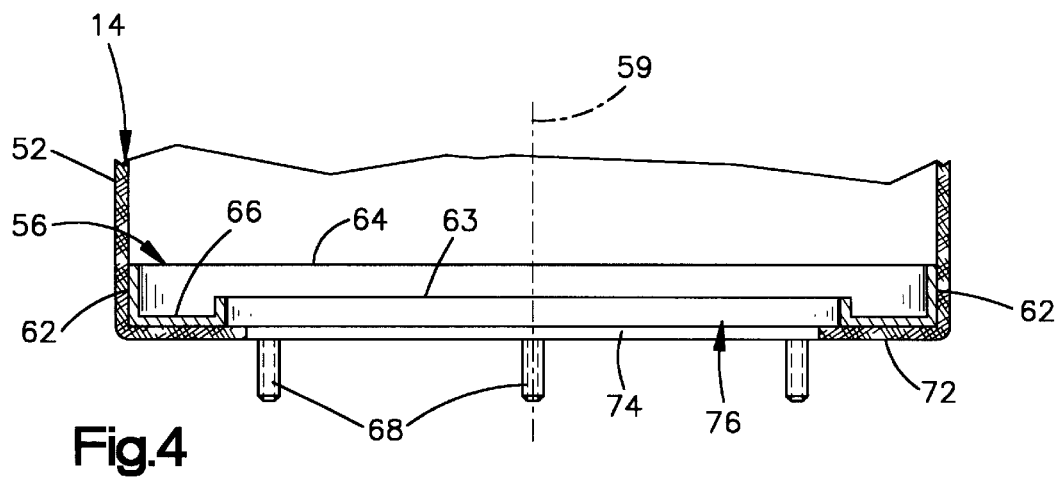
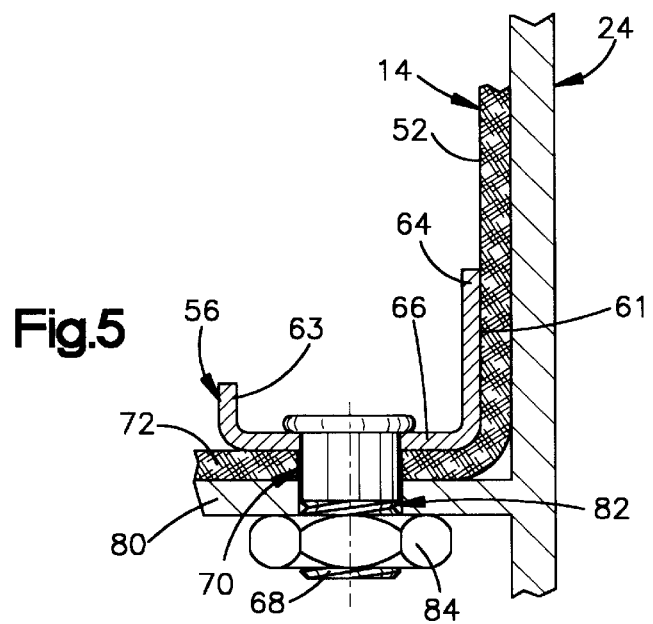

VEHICLE OCCUPANT PROTECTION APPARATUS

FIELD OF THE INVENTION

The present invention relates to an apparatus for helping to protect an occupant of a vehicle, and particularly relates to an apparatus including an inflatable vehicle occupant protection device.

BACKGROUND OF THE INVENTION

An inflatable vehicle occupant protection device, such as an air bag, is stored in a vehicle in a folded condition at a location adjacent to the vehicle occupant compartment. The air bag is part of an apparatus which further includes a crash sensor and an inflator. The crash sensor senses vehicle conditions that indicate the occurrence of a crash. When the crash sensor senses a crash-indicating condition of at least a specified level, the inflator is actuated. The inflator then emits inflation fluid which unfolds and inflates the air bag into the vehicle occupant compartment to help restrain movement of an occupant of the vehicle.

In addition to the air bag and the inflator, the apparatus typically includes a reaction structure and a retainer ring. The reaction structure supports the inflator and the air bag on a part of the vehicle from which the air bag is to be deployed into the vehicle occupant compartment. That part of the vehicle could be the steering wheel, the instrument panel, a door, the roof, a seat, or any other suitable vehicle part.

The retainer ring surrounds the inflator. An edge portion of the air bag also surrounds the inflator. A plurality of fasteners clamp the edge portion of the air bag between the retainer ring and the reaction structure. When the inflation fluid emitted from the inflator flows into the air bag to unfold and inflate the air bag, the retainer ring and the fasteners hold the edge portion of the air bag from being pulled away from the reaction structure by the force of the inflation fluid pressure in the air bag.

SUMMARY OF THE INVENTION

In accordance with the present invention, an apparatus includes an inflatable vehicle occupant protection device and an inflator. The protection device is folded so as to be deployed from a reaction structure in a first direction to restrain movement of a vehicle occupant in a second, opposite direction. The folded protection device has a cross-section with a configuration defined by pleats. Each pleat has an open end and a closed end which is spaced from the open end in a direction substantially parallel to the first and second directions.

The inflator is received within one of the pleats in the folded protection device. Inflation fluid outlet openings in the inflator are located adjacent to the closed end of the pleat in which the inflator is received.

The apparatus further includes a retainer ring. The retainer ring engages and supports a peripheral edge portion of the folded protection device in an open configuration. The retainer ring and the edge portion of the folded protection device are spaced from the inflator on opposite sides of the pleated cross-section of the protection device.

In a first embodiment of the present invention, the folded protection device and the retainer ring have rectangular peripheral shapes. The pleated cross-section of the folded protection device extends across the width of the retainer ring and is uniform along the entire length of the retainer ring. In a second embodiment, the folded protection device and the retainer ring have circular peripheral shapes. The pleated cross-section of the folded protection device extends diametrically across the folded protection device and is uniform entirely around the folded protection device.

BRIEF DESCRIPTION OF THE DRAWINGS

The foregoing and other features of the present invention will become apparent to those skilled in the art to which the present invention relates from reading the following description with reference to the accompanying drawings, in which:

FIG. 1 is a schematic view of a vehicle occupant protection apparatus comprising a first embodiment of the invention;

FIG. 2 is a view showing the apparatus of FIG. 1 in an actuated condition;

FIG. 3 is a view of parts of the apparatus of FIG. 1;

FIG. 4 is a view taken on line 4—4 of FIG. 3;

FIG. 5 is an enlarged partial view of parts of the apparatus of FIG. 1;

DESCRIPTION OF PREFERRED EMBODIMENTS

Figure 6:
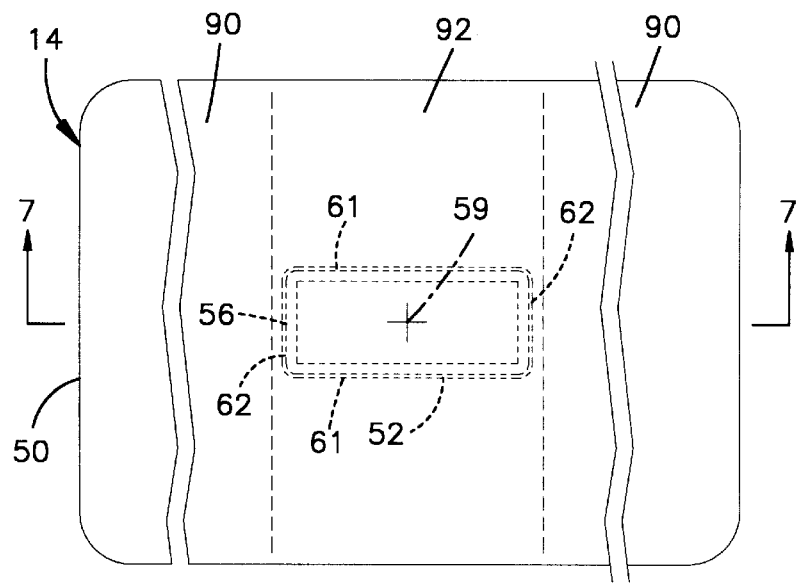
FIG. 6 is a view showing parts of the apparatus of FIG. 1 in a different condition.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from a folded, stored condition, as shown in FIG. 1, to an unfolded, deployed condition, as shown in FIG. 2.

The inflator 12 comprises a source of inflation fluid for inflating the air bag 14. As known in the art, the inflator 12 may contain an ignitable gas generating material for generating a large volume of gas. The inflator 12 may alternatively contain a stored quantity of pressurized inflation fluid, a combination of pressurized inflation fluid and ignitable material for heating the inflation fluid, or any other source of inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 that senses a condition indicating the occurrence of a vehicle crash. Such a condition may comprise, for example, sudden vehicle deceleration caused by a crash. If the crash-indicating condition is above a specified level at which it is desirable to deploy the air bag 14, the switch 20 closes. An actuation signal, such as electric current, is then directed through the inflator 12 to actuate the inflator 12. As a result, the inflator 12 rapidly emits a large volume of inflation fluid which flows into the air bag 14 to inflate the air bag 14.

The air bag 14 and the inflator 12 are mounted on a supporting structure 24 which, in turn, is mounted on a part 26 of the vehicle adjacent to the vehicle occupant compartment 28. The supporting structure 24 in the first embodiment is a reaction canister which contains the air bag 14 and the inflator 12. The supporting structure 24 could alternatively comprise a reaction plate or the like. Accordingly, the vehicle part 26 in the first embodiment is the instrument panel, but could alternatively be the steering column, a door panel, a vehicle seat, or any other suitable part of the vehicle adjacent to the occupant compartment 28. Moreover, the air bag 14 is located in the vehicle with reference to a specified passenger position 30 in the occupant compartment 28. As indicated by the arrow shown in FIG. 2, the inflating air bag 14 moves toward the specified passenger position 30 to restrain movement of a vehicle passenger in the opposite direction toward the instrument panel 26.

The air bag 14 may be constructed of one or more panels of any suitable material known in the art, including woven materials and plastic films. The panels of air bag material are interconnected along seams that are formed by stitches, ultrasonic welds, adhesives, and/or heat staking, depending on the particular air bag material of which the panels are formed.

As shown in FIG. 2, the air bag 14 has a body 50 and a neck 52. When the air bag 14 is being inflated from the condition of FIG. 1 to the condition of FIG. 2, the body 50 of the air bag 14 is deployed from the reaction canister 24. The neck 52 of the air bag 14 is anchored in the reaction canister 24 by a bag retainer ring 56.

The body 50 of the air bag 14 may have any size and shape suitable for helping to restrain movement of a vehicle passenger toward the instrument panel 26. In the first embodiment of the present invention, the body 50 has a generally cylindrical shape. The longitudinal axis 57 of the cylinder extends generally perpendicular to the direction in which the air bag 14 inflates, and extends across a transverse centerline 59 of the air bag 14 when the air bag 14 is fully inflated, as shown in FIG. 2.

The neck 52 of the air bag 14 also may have any suitable size and shape. As shown in FIGS. 3 and 4, the neck 52 in the first embodiment has a rectangular peripheral shape centered on the centerline 59. The bag retainer ring 56 is received within the neck 52 of the air bag 14, and has a corresponding rectangular peripheral shape with opposite sides 61 and opposite ends 62.

The bag retainer ring 56 in the first embodiment has a channel-shaped cross-section defined by a pair of parallel rim portions 63 and 64 projecting from a flat base portion 66. A plurality of screw-threaded mounting studs 68 project from the base portion 66 oppositely relative to the rim portions 63 and 64. The mounting studs 68 are received through apertures 70 in a peripheral edge portion 72 of the neck 52. In this arrangement, the bag retainer ring 56 engages and supports the peripheral edge portion 72 of the neck 52 in an open configuration. A terminal end surface 74 of the edge portion 72 defines a rectangular opening 76 which is substantially bounded by the bag retainer ring 56.

When the air bag 14 is being installed in the reaction canister 24 (FIGS. 1 and 2), the bag retainer ring 56 and the neck 52 of the air bag 14 are received against an inner wall 80 of the reaction canister 24. As shown by way of example in FIG. 5, each mounting stud 68 is received through a corresponding aperture 82 in the inner wall 80. Nuts 84 are tightened onto the mounting studs 68 to draw the bag retainer ring 56 toward the inner wall 80. The bag retainer ring 56 then presses the edge portion 72 of the neck 52 against the inner wall 80 of the reaction canister 24 under the clamping force developed by the nuts 84.

Figure 7:
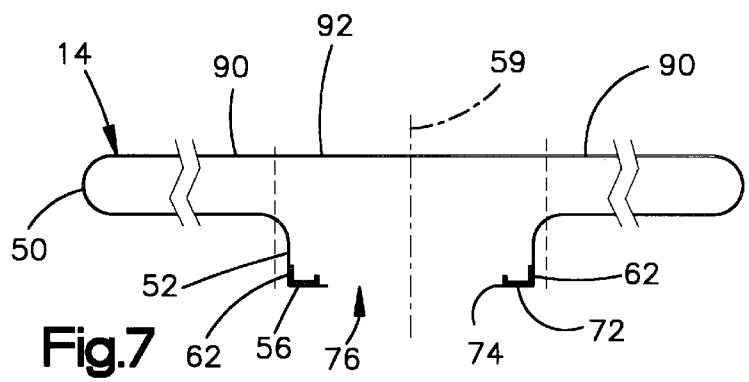
FIG. 7 is a view taken on line 7—7 of FIG. 6.

The air bag 14 is folded in accordance with the present invention before it is installed in the reaction canister 24 with the bag retainer ring 56. The air bag 14 is first placed in the unfolded condition in which it is shown in FIGS. 6 and 7. In that condition, the body 50 of the air bag 14 is spread fully outward over the neck 52 and the bag retainer ring 56. The body 50 then has a pair of opposite end portions 90 projecting longitudinally from a central portion 92 which is located over the neck 52 and the bag retainer ring 56.

Figure 8:
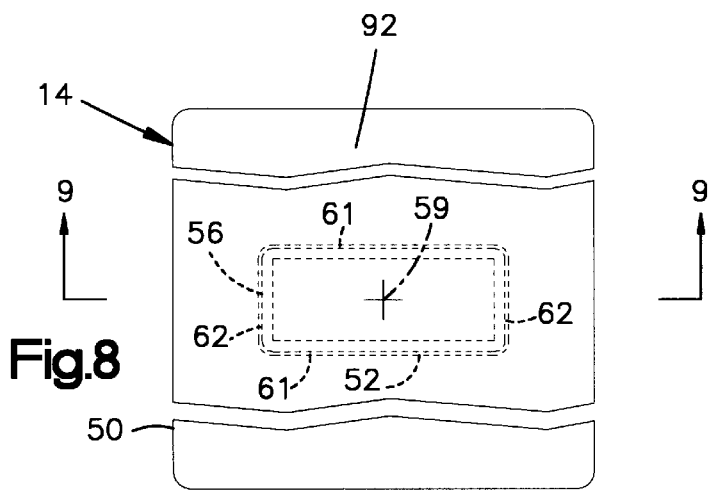
FIG. 8 is a view similar to FIG. 6, with certain parts being shown in different positions.
Figure 9:
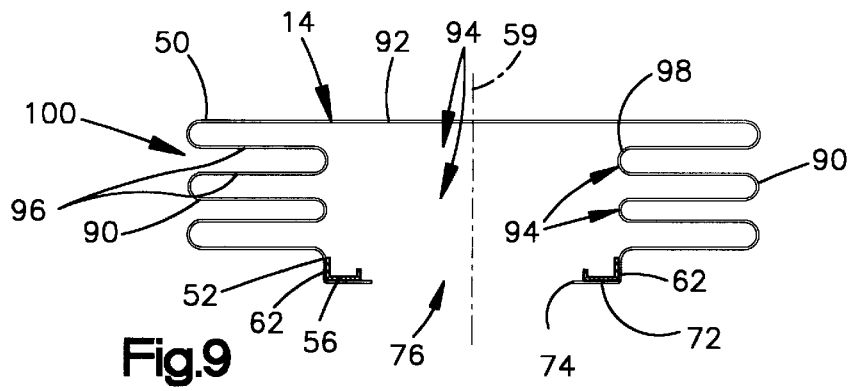
FIG. 9 is a view taken on line 9—9 of FIG. 8.

The length of the body 50 is reduced by folding the opposite end portions 90 into the configurations in which they are shown in FIGS. 8 and 9. Specifically, the opposite end portions 90 of the body 50 are tucked longitudinally inward to form a plurality of pleats 94 (FIG. 9). Each pleat 94 is defined by a pair of adjacent air bag panel sections 96 which are substantially parallel to one another. The two air bag panel sections 96 at each pleat 94 are contiguous with each other along the length of a corresponding folded edge 98 of the air bag panel material. In the cross-sectional configuration of the air bag 14 shown in FIG. 9, each pleat 94 has a closed inner end defined by the corresponding folded edge 98 of the air bag panel material. Each pleat 94 also has an open outer end 100 opposed to the closed inner end 98. The pleat 94 extends between its opposite ends 98 and 100 in a direction perpendicular to the centerline 59.

Figure 10:
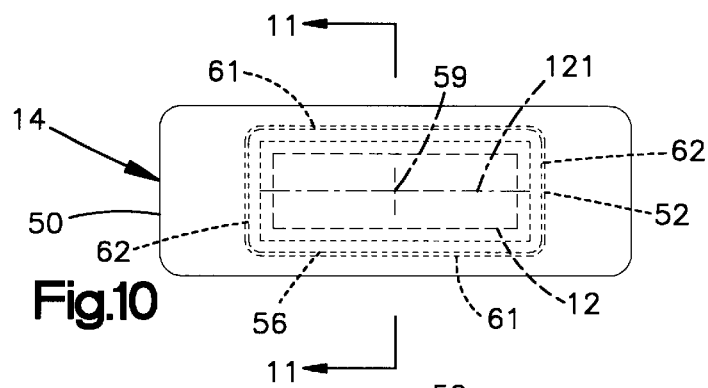
FIG. 10 is a view similar to FIG. 8, with certain parts being shown in different positions.
Figure 11:
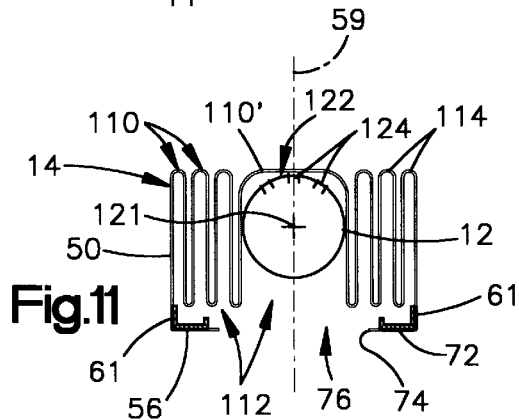
FIG. 11 is a view taken on line 11—11 of FIG. 10.

In a subsequent folding step, the body 50 of the air bag 14 is folded inward from the configuration of FIG. 8 to the configuration of FIG. 10. As shown in FIG. 11, this is accomplished in accordance with the present invention by forming a plurality of additional pleats 110. Each additional pleat 110 extends between its open and closed ends 112 and 114 in a direction substantially parallel to the centerline 59. Each additional pleat 110 thus extends between its open end closed ends 112 and 114 in a direction substantially parallel to the deployment direction indicated by the arrow shown in FIG. 2.

As shown schematically in FIGS. 10 and 11, the inflator 12 is received through the opening 76 in the air bag 14 and is located within one of the additional pleats 110'. The inflator 12 in the first embodiment of the invention is an elongated cylindrical structure with a longitudinal central axis 121. The inflator 12 is oriented such that the axis 121 extends lengthwise of the bag retainer ring 56 and is perpendicular to the centerline 59 of the air bag 14. Such an inflator is typically used for passenger side air bags like the air bag 14, as known in the art, and has an array 122 of inflation fluid outlet openings 124.

In accordance with a particular feature of the present invention, the bag retainer ring 56 and the edge portion 72 of the air bag 14 are spaced fully from the inflator 12 on opposite sides of the cross-section of FIG. 11. Moreover, the array 122 of outlet openings 124 is located adjacent to the closed end 114 of the pleat 110' in which the inflator 12 is received. Inflation fluid emitted from the outlet openings 124 will first flow directly against the closed end 114 of the pleat 110' containing the inflator 14. This will cause that pleat 110' to move toward the passenger position 30 (FIGS. 1 and 2) ahead of the other pleats 110 of FIG. 11, and thereby to pull the other pleats 110 outward toward the passenger position 30. The pleats 110 will then be unfolded and deployed toward the passenger position 30 successively from the pleat 110' at the inflator 12 to the pleats 110 that adjoin the edge portion 72 of the air bag 14 at the bag retainer ring 56. Although the entire body 50 of the air bag 14 is unfolded and deployed toward the passenger position 30, the successive unfolding of the pleats 110' and 110 provides the unfolding body 50 with a configuration that generally consists of a single layer of the air bag panel material moving from the cross-section of FIG. 11 toward the passenger position 30 of FIG. 2 upon deployment of the air bag 14. This feature of the present invention helps to minimize the mass of the unfolding air bag 14 that moves directly against a vehicle occupant.

In accordance with another particular feature of the present invention, the pleats 94 of FIG. 9 are located outward of the opposite ends 62 of the bag retainer ring 56. Therefore, when the air bag 14 is folded from the configuration of FIGS. 8 and 9 to the configuration of FIGS. 10 and 11, the resulting pleats 110 include multiple overlapping layers of the folded air bag panel material at locations outward of the opposite ends 62 of the bag retainer ring 56. However, the pleats 110 include only a single layer of the air bag panel material, as shown in FIG. 11, along the length of the folded air bag 14 between the opposite ends 62 of the bag retainer ring 56. The air bag 14 is thus folded such that the cross-section of FIG. 11, which extends across the width of the bag retainer ring 56, is uniform along the entire length of the bag retainer ring 56. The cross-section of FIG. 11 is thus uniform along the entire length of the inflator 12. This helps to maximize the extent to which only a single layer of the air bag panel material is deployed toward the occupant position 30 of FIG. 2 in the foregoing manner.

Figure 12:
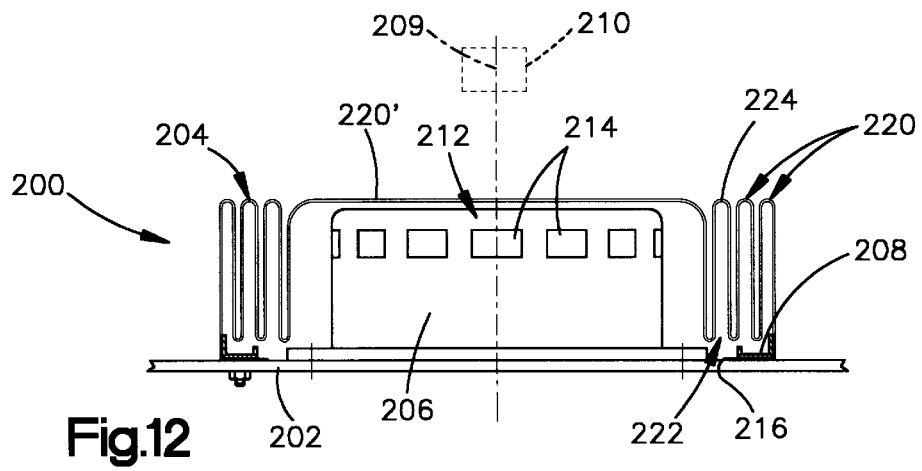
FIG. 12 is a schematic view similar to FIG. 11 showing parts of an apparatus comprising a second embodiment of the invention.

FIG. 12 shows parts of a vehicle occupant protection apparatus 200 comprising a second embodiment of the present invention. Like the apparatus 10 described above, the apparatus 200 includes a reaction structure 202, a folded air bag 204, an inflator 206, and a bag retainer ring 208.

The reaction structure 202 in the second embodiment is a reaction plate which is configured to support the inflator 206 in a known manner on a vehicle part (not shown) such as, but not limited to, a steering column. As compared with the inflator 12 in the first embodiment, the inflator 206 in the second embodiment is a relatively short cylindrical structure, and has a longitudinal central axis 209 extending in a direction from the reaction plate 202 toward a specified occupant position 210. An array 212 of inflation fluid outlet openings 214 extends circumferentially entirely around the inflator 206 near one end of the inflator 206. Such an inflator also is known in the art.

As in the first embodiment, the bag retainer ring 208 in the second embodiment engages and supports a peripheral edge portion 216 of the folded air bag 204 in an open configuration spaced fully from the inflator 206. However, the bag retainer ring 208 and the folded air bag 204 in the second embodiment have circular rather than rectangular peripheral shapes, and preferably have substantially equal diameters, as shown in FIG. 12.

The cross-sectional configuration of the folded air bag 204 that is shown in FIG. 12 is defined by a plurality of pleats 220. Each pleat 220 extends between its open and closed ends 222 and 224 in a direction substantially parallel to the axis 209. Each pleat 220 thus extends between its open and closed ends 222 and 224 in a direction substantially parallel to the direction in which the air bag 204 is unfolded and deployed from the reaction plate 202 toward the specified driver position 210 upon inflation of the air bag 204. Importantly, the cross-sectional configuration of the folded air bag 204 that is shown in FIG. 12 extends diametrically across the folded air bag 204 and is uniform entirely around the folded air bag 204.

Further in accordance with the present invention, the inflator 206 is received within a pleat 220' at the center of the folded air bag 204. The array 212 of inflation fluid outlet openings 214 is located adjacent to the closed end of the central pleat 220'. When the inflator 206 is actuated, inflation fluid emerging from the openings 214 will unfold and deploy the pleats 220 successively from central pleat 220' to the radially outermost pleat 220 adjacent to the bag retainer ring 208. Since the cross-section of FIG. 12 is uniform entirely around the folded air bag 204, the air bag 204 is generally unfolded and deployed from the reaction plate 202 in a configuration in which only a single layer of the air bag panel material is moved toward the occupant position 210 at any location between the reaction plate 202 and the occupant position 210.

The invention has been described with reference to preferred embodiments. From the foregoing the description, those skilled in the art will perceive improvements, changes and modifications. For example, the inflatable vehicle occupant protection devices 14 and 204 in the preferred embodiments of the invention are air bags. Other inflatable vehicle occupant protection devices that can be used in accordance with the invention include inflatable knee bolsters, inflatable head liners or side curtains, knee bolsters operated by inflatable air bags, or the like. Such improvements, changes, and modifications with in the skill of the art are intended to be covered by the appended claims.

Having described the invention, the following is claimed:

1. Apparatus comprising:

an inflatable vehicle occupant protection device which is folded so as to be deployed from a reaction structure in a first direction to help restrain movement of a vehicle occupant in a second, opposite direction, said folded protection device having a cross-section with a configuration defined by pleats, each of said pleats having an open end and a closed end spaced from said open end in a direction substantially parallel to said first and second directions;

an inflator received within one of said pleats, said inflator having inflation fluid outlet openings adjacent to the closed end of said one pleat; and a retainer ring engaging and supporting a peripheral edge portion of said folded protection device in an open configuration, said retainer ring and said edge portion being spaced from said inflator on opposite sides of said cross-section.

2. Apparatus as defined in claim 1 wherein said retainer ring has a rectangular peripheral shape, said cross-section of said folded protection device extending across the width of said retainer ring and being uniform along the entire length of said retainer ring.

3. Apparatus as defined in claim 1 wherein said cross-section of said folded protection device extends diametrically across said folded protection device and is uniform entirely around said folded protection device.

4. Apparatus as defined in claim 1 wherein said cross-sectional configuration of said folded protection device is free of overlapping plies of folded material extending transversely relative to said first and second directions.

5. Apparatus comprising:

an inflatable vehicle occupant protection device which is folded so as to be deployed from a reaction structure in a first direction to help restrain movement of a vehicle occupant in a second, opposite direction, said folded protection device having a configuration defined by pleats, each of said pleats having an open end and a closed end spaced from said open end in a direction substantially parallel to said first and second directions;

an elongated inflator received within one of said pleats; and a rectangular retainer ring engaging and supporting a peripheral edge portion of said folded protection device in an open configuration, said folded protection device extending across the width of said retainer ring and being uniform along the entire length of said retainer ring.

6. Apparatus as defined in claim 5 wherein said pleated configuration is defined by a single layer of material which is folded to define said pleats, said folded protection device including multiple overlapping layers of folded material at locations outward of the opposite ends of said inflator.

* * * * *